United States Patent [19]

Sanders

[11] Patent Number: 4,673,293
[45] Date of Patent: Jun. 16, 1987

[54] PASSIVE CAVITY GYRO BIAS ELIMINATOR

[75] Inventor: Glen A. Sanders, Plymouth, Minn.

[73] Assignee: Honeywell Inc., Minneapolis, Minn.

[21] Appl. No.: 696,816

[22] Filed: Jan. 31, 1985

[51] Int. Cl.[4] ............................................. G01C 19/34
[52] U.S. Cl. .................................................... 356/350
[58] Field of Search ........................................ 356/350

[56] References Cited

U.S. PATENT DOCUMENTS

| | | | |
|---|---|---|---|
| 4,274,742 | 6/1981 | Lustig | 356/350 |
| 4,352,562 | 10/1982 | Minden | 356/350 |
| 4,420,258 | 12/1983 | Burns et al. | 356/350 |

OTHER PUBLICATIONS

"Passive Ring Resonator Laser Gyroscope", Ezekiel et al., Applied Physics Letters, vol. 30, No. 9, 5-1977, pp. 478-480.
"Passive Ring Resonator For Sensitive Inertial Rotation Measurements in Geophysics and Relativity", Sanders et al., Optics Letters, 11-1981, pp. 569-571.

Primary Examiner—Vincent P. McGraw
Assistant Examiner—S. A. Turner
Attorney, Agent, or Firm—Robert A. Pajak

[57] ABSTRACT

Disclosed is a passive ring resonator and a control scheme for correcting bias effects due to intensity variations of waves propagating within the resonator.

9 Claims, 2 Drawing Figures

PASSIVE CAVITY GYRO BIAS ELIMINATOR

PASSIVE CAVITY GYRO BIAS ELIMINATOR

This invention relates to the elimination of the Kerr effect in a passive cavity laser angular rate sensor.

Passive cavity laser angular rate sensors are well known and illustrated, for example, in U.S. Pat. No. 4,135,822 issued to Shaoul Ezekial. Briefly, in such sensors, an electromagnetic wave is coupled to a passive ring resonator so as to cause counter-propagating waves therein. Since rotation affects the optical cavity closed-loop path length in proportion to rotation, the resonant frequency of the waves is affected in relation to the rotation rate. If the frequency is fixed, the amplitude or intensity of the counter-propagating waves is affected in relation to the rotation rate. In Ezekial, the magnitude and direction of an inertial rotation is determined by adjusting the frequency of each counter-propagating electromagnetic wave to the corresponding cavity resonant frequency in each direction. The amount of adjustment may then be used as a measurement of rotation rate. There are, of course, other schemes for determining the rotation rate in such sensors.

The advancement of the art of passive laser angular rate sensors now include optical fibers, semiconductor waveguides and the like, as the means for providing the passive cavity.

BRIEF DESCRIPTION OF THE INVENTION

In the present invention, a passive ring resonator rotation sensor is provided with a means to determine an error signal related to a sensor bias caused by intensity differences between the waves propagating within the cavity. The error signal is utilized as an input to a feedback control means to alter the intensity of at least one of the counter-propagating waves in a manner to drive the error signal and the sensor intensity related bias error towards zero.

DETAILED DESCRIPTION OF THE INVENTION

Figure 1:
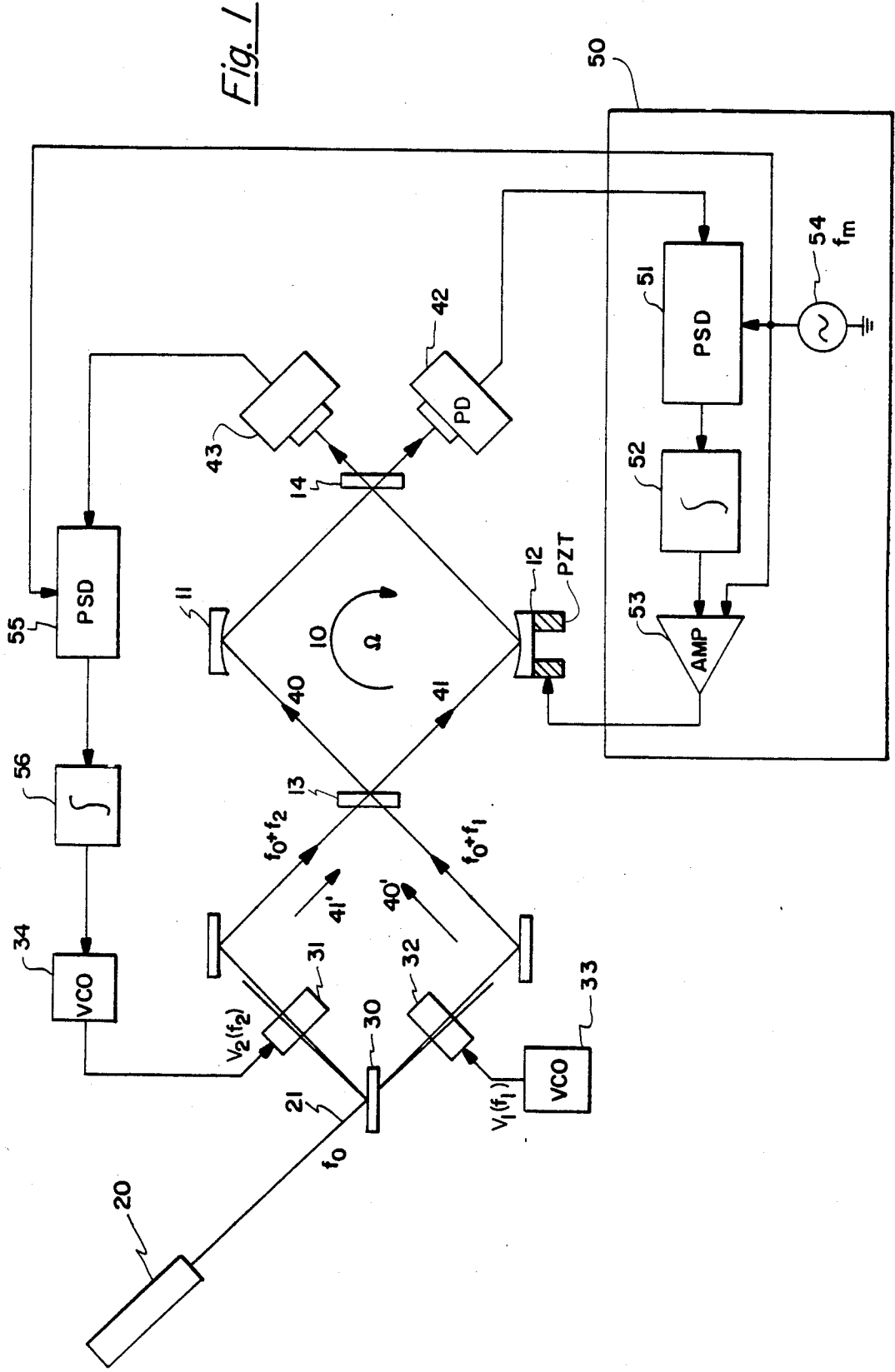
FIG. 1 depicts an arrangement of a prior art passive cavity laser angular rate sensor.

Shown in FIG. 1 is substantially the schematic diagram of the passive ring resonator rotation sensor shown and described in a publication entitled, *Passive Ring Resonator Method for Sensitive Inertial Rotation Measurements in Geophysics and Relativity*, by G. A. Sanders, M. G. Prentiss, and S. Ezekiel, Optics Letters, November 1981, Vol. 6, No. 11. Shown in FIG. 1 is a passive ring resonator 10 in the form of a closed-loop square or ring. The passive ring resonator is shown having two spherical maximum-reflectivity mirrors 11 and 12, and two 99%-reflectivity flat mirrors 13 and 14 used for coupling laser beams into and out of the cavity 10. Source 20 provides an electromagnetic wave $f_o$ such as a laser beam. Beam 21 is split into two beams by way of beam splitter 30. Each of the split beams is shifted in frequency by an acousto-optic modulator 31 and 32 before being coupled into resonator 10. Beam 40 propagating in the clockwise direction in cavity 10 is shifted by a fixed frequency $f_1$, and the counterclockwise beam 41 is shifted by $f_2$. The shift frequencies $f_1$ and $f_2$ are provided by a voltage controlled oscillator (VCO) 33 connected to acousto-optic modulator 32 and VCO 34 connected to acousto-optic modulator 31, respectively.

Flat mirror 14 provides a portion of beam 40 to impinge on photodetector 42 and a portion of beam 41 to impinge on photodetector 43. The position of mirror 12 is mounted on a PZT transducer or crystal for cavity-length adjustment. The PZT device is capable of controlling the cavity length of resonator 10. The PZT is controlled by a feedback control circuit 50 including a phase sensitive demodulator 51, integrator 52, summing amplifier 53, and source 54 providing a modulation frequency $f_m$. Feedback control circuit 50 locks the clockwise resonance frequency of cavity 10 to the beam 40 laser frequency $f_0+f_1$ via the PZT transducer.

In operation, the output of detector 42, representative of the beam intensity of beam 40, is demodulated by demodulator 51 at frequency $f_m$ (36 kHz) and then passed through integrator 52 followed by a voltage summing amplifier which drives the PZT coupled to mirror 12. The system adjusts the optical cavity 10 length so that the beam intensity of beam 40 is a maximum. In these circumstances, the resonant frequency of cavity 10 is the same as the frequency of beam 40, namely frequency $f_0+f_1$. This is accomplished by the intensity peak detecting control circuit 50.

A second feedback control circuit is shown including a phase sensitive demodulator 55, integrator 56, and voltage controlled oscillator 34. The second feedback control circuit adjusts frequency $f_2$ by means of voltage controlled oscillator 31 so that beam 41, having frequency $f_0+f_2$, is locked to the center of the counterclockwise resonance of cavity 10.

In operation, demodulator 55 demodulates the output of photodetector 43 at the modulation frequency $f_m$ of source 54. The output is integrated by integrator 56 to drive the voltage controlled oscillator 34. The output of VCO 34 is applied to modulator 31 to adjust $f_2$ as required. If there is no inertial rotation (or any other noise or bias source) the clockwise and counterclockwise resonant frequencies of the cavity are identical and, therefore, $f_1=f_2$. In the presence of inertial rotation, $f_{CW}$ and $f_{CCW}$ will be separated by a frequency, $f_1-f_2$, which is an indication of the rotation rate. Furthermore, the measurement of $f_1-f_2$ is also an indication of the difference frequency $f_{CW}-f_{CCW}$ which is related to the rotation rate by a scale factor.

In ideal circumstances, with no inertial rotation input, the frequency of beams 40 and 41 are identical. Accordingly, frequencies $f_1$ and $f_2$ are also identical. However, if the intensity of beams 40 and 41 are unequal, a Kerr bias may result, which in turn, would result in $f_1$ not being equal to $f_2$. In the usual sensor application, the Kerr bias exhibits itself as rotation even though there was no input rotation.

If the passive cavity waveguide 10 contains a medium with non-linear properties and the intensities of light beams 40 and 41, represented as $I_2$ and $I_3$ are unequal, a rotation bias error results given by equation (1):

$$\delta\Omega = K(I2' - I3')$$

where K is the constant of proportionality. This bias error appears as a rotation but, of course, is not.

In the present invention, the intensity of the beams 40 and 41 are actively controlled by the use of a feedback control means to eliminate the Kerr bias. Since photodetector beams 40" and 41" are directly related to the input beam 21', $I_o$, equation (1) may be written as follows:

$$\delta\Omega = I_o K(C2 - C3) \quad (2)$$

where C2 and C3 are proportionality coefficients due to any intensity bias affects caused by the resonators and/or couplers and/or beam splitters.

Figure 2:
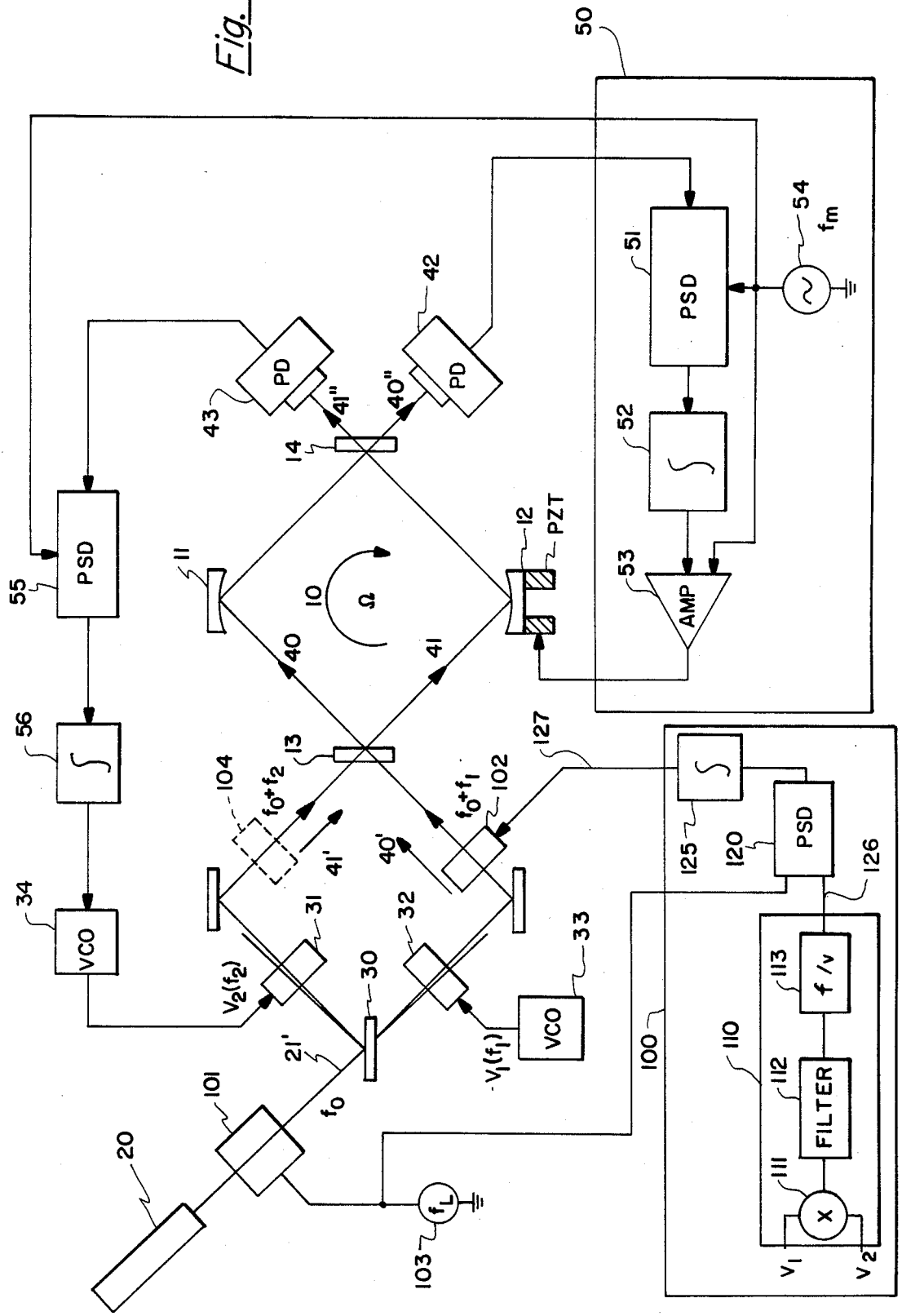
FIG. 2 shows a passive cavity angular rate sensor in accordance with the present invention.

Referring now to FIG. 2, there is shown a passive ring resonator and a bias eliminator in accordance with the present invention. The circuit of FIG. 2, except for the addition of circuit block 100, intensity modulator 101, intensity modulator 102, and modulation source 103, has therein the components of FIG. 1 and so the same numeral designations are used in FIG. 2 as used in FIG. 1.

In FIG. 2, the output of source 20 is passed through intensity modulator 101 controlled by modulation source 103 for producing an amplitude modulated wave 21'. Beam 21' is split into beams 41' and 40' for generating beams 40 and 41, respectively. Before being coupled into resonantor 10, beam 40' passes through an intensity modulator 102 controlled by the output of circuit 100 as will be described.

Circuit 100 includes a frequency difference or beat frequency detector 110 responsive to signals representative of frequencies $f_1$ and $f_2$ from VCO 33 and 34, respectively. The input signals to frequency modulators 31 and 33, identified as signals $V_1$ and $V_2$, are representative of frequencies $f_1$ and $f_2$, respectively, and therefore are useful input signals to multiplier 111. Circuit 110 provides an output signal 126 representative of the difference between the resonant beam frequencies of beams 40 and 41, propagating and recirculating through cavity 10. This frequency difference is commonly referred to as the beat frequency. Circuit 110 is shown in FIG. 2 to include multiplier 111 for obtaining a signal representative of the beat frequency $f_1 - f_2$. The output of multiplier 111 passes through a filter 112 and presented to a frequency to voltage converter 113. The output signal 126 of converter 113 is representative of the beat frequency between beams 40 and 41. The output signal 126 of converter 113 is presented to a phase sensitive demodulator 120 for demodulating the output of converter 113 at the light intensity modulation source 103 frequency $f_L$. The output of the phase sensitive demodulator 120 is passed through an integrator 125 having the output thereof 127 connected to the intensity modulator 102.

The additional circuit components shown in FIG. 2 over that shown in FIG. 1 provides a means for driving the bias error due to intensity affects in the passive cavity sensor system toward a zero condition. Circuit 100 output signal 127 provides an error signal related to the variations in the intensity difference between beams 40 and 41 of the cavity. This is so since the beat frequency is indicative of the rotation rate. Variations in beam 21' will cause variations in intensities of beams 40 and 41 affecting the clockwise and counterclockwise resonant frequencies of the cavity. Therefore, variations in the resonant frequencies due to light intensity variations results in variations in the perceived output rotation. This is so since rotation rate is a function of the difference between the resonant frequencies of the cavity. Accordingly, the beam intensity related rotation bias will then be that as described by equation (2). Control circuit 100 controls intensity modulator 102 to increase or decrease beam 40' to equalize the beam intensities so as to drive the bias value as described by equation (2) towards zero.

It should be recognized by those skilled in the art, that the intensity modulator 101 may be eliminated and transducer 102 may be alternatively driven by the output of integrator 125 in addition to a signal from modulation source 103. Furthermore, intensity modulator 102 may have been alternately placed in the path of beam 41' so as to alternatively increase or decrease the intensity of beam 41' for the same intended purpose as already described.

As a further alternative, another intensity modulator may be placed in the path of beam 41' and have the output of integrator 125 operate intensity modulators 102 and 104 in a push-pull fashion.

It should be particularly noted that the frequency of source 54 should be different than source 103 for control purposes. It is desirable that the source 54 modulation frequency $f_m$ should be greater than the $f_2$ of source 103.

It should be noted that if the output of demodulator 55 is not connected to integrator 56, then the demodulator 55 output is indicative of both rotation and bias, in sign and magnitude. With no rotation input, variations in intensity will result in variations in the output of demodulator 55 thereby indicating a measurement of the bias due to intensity variations. In this configuration, the output of PSD 55 may be used as the input to PSD 120 to drive the bias to zero.

The embodiments of the invention in which an exclusive property or right is claimed are defined as follows:

1. A passive ring resonator angular rate sensor comprising:
   passive resonator means permitting the propagation of clockwise and counterclockwise beams of electromagnetic energy and having clockwise and counterclockwise resonant frequencies;
   source means for introducing said clockwise and counterclockwise beams into said passive resonator means;
   signal means responsive to said clockwise and counterclockwise beams for producing an output signal indicative of the difference between said clockwise and counterclockwise resonant frequencies;
   means for determining an error signal related to variations in said output signal due to variations in the intensity difference between said counter-propagating beams; and
   control means responsive to said error signal for altering the intensity of at least one of said counter-propagating beams so as to drive said error signal toward zero.

2. The apparatus of claim 1 further comprising:
   means for modulating the intensity of at least one of said beams in accordance with a first modulation signal;
   means for controlling the intensity of at least one of said beams; and
   said control means including demodulation means responsive to said error signal and said modulation signal for producing said control signal.

3. The apparatus of claim 1 wherein said source means includes a laser beam impinging upon a beam splitter thereby splitting said laser beam and generating said clockwise and said counterclockwise beams.

4. An angular rate sensor comprising:

a passive ring resonator permitting counter-propagation and recirculation of first and second beams of electromagnetic energy in first and second directions through said ring resonator, said ring resonator having an optical path length which defines a resonant frequency for beams traveling in each of said first and second directions in relation to the rate of rotation of said ring resonator;

source means for introducing said first and second beam into said passive resonator means;

means for producing an output signal indicative of the frequency difference between said first and second beam frequencies;

means for determining an error signal related to variations in said output signal due to variations in the intensity difference between said first and second beams; and control means responsive to said error signal for altering the intensity of at least one of said first and second beams so as to drive said error signal toward zero.

5. The sensor of claim 4 further comprising:

means for modulating the intensity of at least one of said first and second beams in accordance with a first modulation signal;

means for controlling the intensity of at least one of said first and second beams; and said control means including demodulation means responsive to said error signal and said modulation signal for producing said control signal.

6. The sensor of claim 4 wherein said source means includes a laser beam impinging upon a beam splitter thereby splitting said laser beam and generating said first and second beams.

7. The sensor of claim 4 further comprising means operative to substantially cause said first beam to be at the resonant frequency of said passive resonator in said first direction and said second beam to be at the resonant frequency of said passive resonator in said second direction.

8. The sensor of claim 4 wherein said passive ring resonator comprises an optical fiber.

9. The sensor of claim 8 further comprising:

means for altering the effective length of said optical fiber to have a resonant frequency equal to said first frequency in said first direction, and means for altering the frequency of said second beam to be at the resonant frequency of said optical fiber in said second direction.

* * * * *